United States Patent
Reifenberg et al.

[15] 3,673,230
[45] June 27, 1972

[54] METHOD OF PREPARING HEXAORGANODISTANNANES

[72] Inventors: Gerald H. Reifenberg, Highstown; William J. Considine, Somerset, both of N.J.

[73] Assignee: Mat Chemicals Inc., New York, N.Y.

[22] Filed: Jan. 18, 1971

[21] Appl. No.: 107,575

Related U.S. Application Data

[62] Division of Ser. No. 773,329, Nov. 4, 1968.

[52] U.S. Cl. ............................................ 260/429.7, 252/431
[51] Int. Cl. .................................................. C07f 7/22
[58] Field of Search .................................. 260/429.7

[56] References Cited

UNITED STATES PATENTS 3,439,010  4/1969  Okawara et al. ..................... 260/429.7

*Primary Examiner*—Tobias E. Levow
*Assistant Examiner*—Werten F. W. Bellamy
*Attorney*—Kenneth G. Wheeless and Robert P. Grindle

[57] ABSTRACT

This invention is a method for preparing compounds of the formula $R_3SnSnR_3$ comprising pyrolyzing a triorganotin formate of the formula

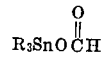

wherein R is a hydrocarbon selected from the group consisting of alkyl, alkenyl, aralkyl, and cycloalkyl radicals, and separating $R_3SnSnR_3$.

4 Claims, No Drawings

METHOD OF PREPARING HEXAORGANODISTANNANES

This application is a divisional application of Ser. No. 773,329, filed Nov. 4, 1968.

This invention relates to a novel process for producing organotin compounds.

This invention is a method for preparing compounds of the formula $R_3SnSnR_3$ comprising pyrolyzing a triorganotin formate of the formula $$R_3SnOCH\!\!\underset{\|}{\phantom{X}}\!\!O$$

wherein R is a hydrocarbon selected from the group consisting of alkyl, alkenyl, aralkyl, and cycloalkyl radicals, and separating $R_3SnSnR_3$.

According to another of its aspects, the method of this invention for preparing compounds $R_3SnSnR_3$ comprises heating a first moiety of triorganotin formate of the formula $$R_3SnOCH\!\!\underset{\|}{\phantom{X}}\!\!O$$

to form triorganotin hydride of the formula $R_3SnH$ wherein R is a hydrocarbon radical selected from the group consisting of alkyl, alkenyl, aralkyl, and cycloalkyl, reacting as reactants said triorganotin hydride and a second moiety of triorganotin formate at a temperature of at least about 100° C., and recovering $R_3SnSnR_3$.

Typical triorganotin formate starting materials operable in the practice of this invention include: triethyltin formate, tri-n-propyltin formate, tri-n-butyltin formate, tri-n-amyltin formate, tri-n-octyltin formate, and tricyclohexyltin formate.

In the reactant $$R_3SnOCH\!\!\underset{\|}{\phantom{X}}\!\!O$$

R is a hydrocarbon radical preferably selected from the group consisting of alkyl, alkenyl, cycloalkyl, and aralkyl including such radicals when inertly substituted. When R is alkyl, it may typically be straight chain alkyl or branched alkyl, including ethyl, n-propyl, isopropyl, n-butyl, isobutyl, sec-butyl, n-amyl, neopentyl, isoamyl, n-hexyl, isohexyl, heptyls, octyls, decyls, dodecyls, tetradecyl, octadecyl, etc. Preferred alkyl includes lower alkyl, i.e. having less than about nine carbon atoms, i.e., octyls and lower. When R is alkenyl, it may typically be vinyl, allyl, 1-propenyl, methallyl, buten-1-yl, buten-2-yl, penten-1-yl, hexenyl, heptenyl, octenyl, decenyl, dodecenyl, tetradecenyl, octadecenyl, etc. When R is cycloalkyl, it may typically be cyclopentyl, cyclohexyl, cycloheptyl, cycloactyl, etc. When R is aralkyl, it may typically be benzyl, β-phenylethyl, γ-phenylpropyl, α-phenylpropyl, etc. R may be inertly substituted, e.g. may bear a non-reactive substituent such as alkyl, cycloalkyl, aralkyl, alkenyl, ether, ester, etc. Typical substituted alkyls include 2-ethoxyethyl, carboethoxymethyl, etc. Substituted alkenyls include γ-phenylpropenyl, etc. Substituted cycloalkyls include 4-methylcyclohexyl, etc. Inertly substituted aralkyl includes p-phenylbenzyl, p-methylbenzyl, etc.

In the practice of this invention it is desirable to use an inert diluent. Typical inert diluents include inert hydrocarbons such as benzene, toluene, etc., and aliphatic hydrocarbons including hexane, heptane, octane, etc. Preferably the solvent is one which has a boiling point at atmospheric pressure of at least about 100° C., and typically 100° to 200° C.

The reaction of this invention is preferably carried out under inert atmosphere, e.g. nitrogen, since the products, e.g. hydrides and ditins may be oxidized by oxygen.

In carrying out the novel reaction of this invention, the raw material is maintained at 150° to 200° C. for 2 hours to 12 hours.

In the practice of this invention the following reactions may occur

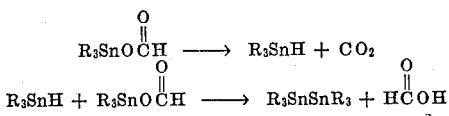

Trialkyltin hydrides formed as intermediates in the practice of this invention include triethyltin hydride, tri-n-propyltin hydride, tri-isopropyltin hydride, tri-n-octyltin hydride, and tricyclohexyltin hydride.

At the completion of the reaction, after the by-products have been removed, the product may be separated and recovered by conventional means. When the product is present together with the diluent, the product, if insoluble in the diluent, may be filtered, washed, and further purified if desired. If the pure product is soluble in the diluent it may be separated by distillation under reduced pressure.

For the purpose of giving those skilled in the art a better understanding of the invention, reference is made to the following examples.

EXAMPLE 1

Preparation of hexabutylditin.

Into a reaction vessel maintained under an atmosphere of nitrogen, 50.0 grams (0.15 mole) of tributyltin formate was introduced. The two-necked, 100 milliliter reaction vessel was fitted with a magnetic stirring bar, a water condenser, and a thermometer. The tributyltin formate was heated at temperatures ranging from 150° to 185° C. for 11.5 hours during which time a flow of nitrogen gas was maintained by the reaction vessel. At the end of 11.5 hours, the reaction mass exhibited a weight of 38.3 grams. Vapor phase chromatographic analysis of the product showed that the yield of hexabutylditin was 77.5 percent of the reaction mass, tributyltin formate was 10.4 percent of the reaction mass, tetrabutyltin was 5.2 percent and tributyltin hydride was 6.9%.

EXAMPLE 2

Preparation of hexapropylditin.

Into a reaction vessel maintained under an atmosphere of nitrogen, 29.3 grams (0.1 mole) of tripropyltin formate was introduced. The tripropyltin formate was heated at a temperature of 120° C., initially, agitated, and incrementally, increased to a temperature of 180° C. The reaction time was 21.5 hours during which time a flow of nitrogen was continuously maintained to the reaction vessel. The entire reaction mass was distilled under vacuum using a fractionating head. The distillate exhibited a weight of 48.3 grams. Vapor phase chromatographic analysis of the product showed that the yield of hexapropylditin was 42.0 percent of the distillate.

EXAMPLE 3

Preparation of hexabutylditin.

Into a reaction vessel maintained under an atmosphere of nitrogen was introduced 11.6 grams (0.04 mole) of tributyltin hydride and 13.4 grams (0.04 mole) of tributyltin formate. The reaction mixture was heated at a temperature of 145° to 165° C. for 5.5 hours. Vapor phase chromatographic analysis of the product showed that the yield of hexabutylditin was 54.5 percent of the reaction mass. Tributyltin formate was 33.8 percent of the reaction mass and tributyltin hydride was 5.3 percent.

EXAMPLE 4

Preparation of hexapropylditin.

Into the reaction vessel maintained under an atmosphere of nitrogen was introduced 10.0 grams (0.4 mole) of tripropyltin hydride and 11.7 grams (0.04 mole) of tripropyltin formate.

The procedure of Example 3 was followed to obtain a yield of 46.4 percent of hexapropylditin. Vapor phase chromatographic analysis indicated that tripropyltin formate comprises 41.4 percent of the reaction mass and propyltin hydride comprised 3.8 percent.

The products of the process of this invention are also useful as catalysts for various reactions. The compounds of this invention are useful as catalysts for a polymerization of ethylene and propylene. For example, they are also used in the polymerization of diene hydrocarbons having conjugated double bonds in the presence of cobalt or nickel compounds and aluminum halides, e.g. cobalt naphthenate and aluminum.

Although this invention has been illustrated by reference to specific examples, numerous changes and modifications thereof which clearly fall within the scope of the invention will be apparent to those skilled in the art.

We claim:

1. A method for preparing compounds $R_3SnSnR_3$ comprising heating a first moiety of triorganotin formate of the formula

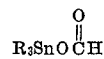

to form triorganotin hydride of the formula $R_3SnH$ wherein R is a hydrocarbon radical selected from the group consisting of alkyl, alkenyl, aralkyl, and cycloalkyl, reacting as reactants said triorganotin hydride and a second moiety of triorganotin formate at a temperature of at least about 100° C., and recovering $R_3SnSnR_3$.

2. The process of claim 1 wherein R exhibits less than nine carbon atoms.

3. The process of claim 1 wherein R is propyl.

4. The process of claim 1 wherein R is butyl.

* * * * *